(12) United States Patent
Lee et al.

(10) Patent No.: US 11,676,013 B2
(45) Date of Patent: Jun. 13, 2023

(54) JOB-LAUNCH TIME REDUCTION BY NODE PRE-CONFIGURATION

(71) Applicant: International Business Machines Corporation, Armonk, NY (US)

(72) Inventors: Eun Kyung Lee, Bedford Corners, NY (US); Giacomo Domeniconi, White Plains, NY (US); Alessandro Morari, New York, NY (US); Yoonho Park, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 16/730,401

(22) Filed: Dec. 30, 2019

(65) Prior Publication Data

US 2021/0201130 A1    Jul. 1, 2021

(51) Int. Cl.
  *G06N 3/08* (2023.01)
  *G06F 9/445* (2018.01)
  *G06N 3/044* (2023.01)

(52) U.S. Cl.
  CPC .......... *G06N 3/08* (2013.01); *G06F 9/44505* (2013.01); *G06N 3/044* (2023.01)

(58) Field of Classification Search
  CPC .... G06F 9/44505; G06N 3/08; G06N 3/0445; G06N 3/044
  See application file for complete search history.

(56) References Cited

U.S. PATENT DOCUMENTS

| | | | | |
|---|---|---|---|---|
| 7,487,504 | B2* | 2/2009 | Peterson | G06F 9/505 718/104 |
| 8,326,793 | B1* | 12/2012 | Bowers | G06F 9/50 706/62 |
| 8,832,003 | B1* | 9/2014 | Bowers | H04W 64/00 706/12 |
| 9,471,373 | B2* | 10/2016 | Glew | G06F 9/5011 |
| 9,825,875 | B2* | 11/2017 | Bhatia | H04L 43/10 |
| 10,228,982 | B2 | 3/2019 | Arora et al. | |
| 10,230,817 | B2 | 3/2019 | Thierry et al. | |
| 10,535,011 | B2* | 1/2020 | Cohen | G06F 3/0683 |
| 2003/0036875 | A1* | 2/2003 | Peck | G06F 9/44505 702/127 |
| 2013/0111488 | A1* | 5/2013 | Gatti | G06N 20/10 718/103 |
| 2014/0095693 | A1* | 4/2014 | Apte | H04L 67/535 709/224 |
| 2014/0365626 | A1* | 12/2014 | Radhakrishnan | G06F 9/45558 709/222 |

(Continued)

OTHER PUBLICATIONS

Silva, J.N., et al., "Heuristic for resources allocation on utility computing infrastructures", MGC '08, Dec. 1-5, 2008, 6 pages.

(Continued)

*Primary Examiner* — Douglas M Slachta
(74) *Attorney, Agent, or Firm* — Scully, Scott, Murphy & Presser, P.C.; Daniel P. Morris

(57) ABSTRACT

Based on historic job data, a computer processor can predict a configuration of a computer node for running a future computer job. The computer processor can pre-configure the computer node based on the predicted configuration. Responsive to receiving a submission of a job, the computer processor can launch the job on the pre-configured computer node.

20 Claims, 9 Drawing Sheets

(56) References Cited

U.S. PATENT DOCUMENTS

| | | | |
|---|---|---|---|
| 2015/0277908 A1* | 10/2015 | Bradbury | G06F 9/45545 718/1 |
| 2017/0091468 A1* | 3/2017 | Demchenko | G06F 21/53 |
| 2018/0247083 A1* | 8/2018 | Rizzo | G06F 21/6218 |
| 2019/0050467 A1* | 2/2019 | Parekh | G06F 16/951 |
| 2019/0243691 A1* | 8/2019 | LaBute | H04L 47/70 |
| 2019/0303709 A1* | 10/2019 | Hu | G06N 3/04 |

OTHER PUBLICATIONS

Xhafa, F., et al., "Computational models and heuristic methods for Grid scheduling problems", Future Generation Computer Systems, Apr. 2010, 38 pages, vol. 26, Issue 4.

Fuson, C., "Summit jsrun Introduction OLCF February User Call", https://www.olcf.ornl.gov/wp-content/uploads/2018/02/SummitJobLaunch.pdf, Feb. 28, 2018, 27 pages.

Nist, "Nist Cloud Computing Program", http://csrc.nist.gov/groups/SNS/cloud-computing/index.html, Created Dec. 1, 2016, Updated Oct. 6, 2017, 9 pages.

Emeras, J., et al., "EVALIX: Classification and Prediction of Job Resource Consumption on HPC Platforms", N. Desai and W. Cirne (Eds.): Job Scheduling Strategies for Parallel Processing 19th and 20th International Workshops, JSSPP 2015, May 26, 2015 and JSSPP 2016, May 27, 2016 Revised Selected Papers, pp. 102-122, LNCS10353.

Cunha, R.L.F, et al., "Job Placement Advisor Based on Turnaround Predictions for HPC Hybrid Clouds", Future Generation Computer Systems 67 (2017), Received Apr. 29, 2016, Revised Jul. 25, 2016, Accepted Aug. 22, 2016, Availavle online Aug. 31, 2016, pp. 35-46.

Reyhani, et al., "A heuristic method for forecasting chaotic time series based on economic variables", Digital Information Management (ICDIM), Sixth International Conference on. IEEE, 2011, pp. 300-304.

Huarng, K., "Heuristic models of fuzzy time series for forecasting", Fuzzy Sets and Systems 123 (2001), Received Sep. 2, 1998, revised May 18, 2000, Accepted May 29, 2000, pp. 369-386.

Maguire, L.P., et al. "Predicting a chaotic time series using a fuzzy neural network", Information Sciences 112 (1998), Received Feb. 1, 1997, Revised Jan. 11, 1998, pp. 125-136.

Applebaum, M., et al., "A heuristic method for estimating time-series models for forecasting." Applied Mathematics and Computation 16 (1985), pp. 265-275.

* cited by examiner ical network (RNN) is a class of artificial neural network where connections between nodes form a directed graph along a temporal sequence. This allows it to exhibit temporal dynamic behavior. RNNs can use their internal state (memory) to process sequences of inputs.

JOB-LAUNCH TIME REDUCTION BY NODE PRE-CONFIGURATION

BACKGROUND

The present application relates generally to computers and computer applications, and more particularly to node pre-configuration and reducing job-launch time.

Computer systems run or execute jobs or services, for example, requested or submitted by users. Running a job on a computer system, for example, on a superscalar system or a cloud-based system, or another, requires that one or more computer nodes or servers be set up or configured to run the requested job. Having to configure one or more computer nodes or servers to run a job can change the launch time for that job.

BRIEF SUMMARY

A system, in an aspect, may include a computer processor and a memory device operatively coupled with the computer processor. The computer processor can be configured to, based on historic job data, predict a configuration of a computer node for running a future computer job. The computer processor can also be configured to pre-configure the computer node based on the predicted configuration. The computer processor can further be configured to, responsive to receiving a submission of a job, launch the job on the pre-configured computer node.

A computer-implemented method, in an aspect, may include, based on historic job data, predicting a configuration of a computer node for running a future computer job. The method may also include pre-configuring the computer node using the predicted configuration. The method may further include, responsive to receiving a submission of a job, launching the job on the pre-configured computer node.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
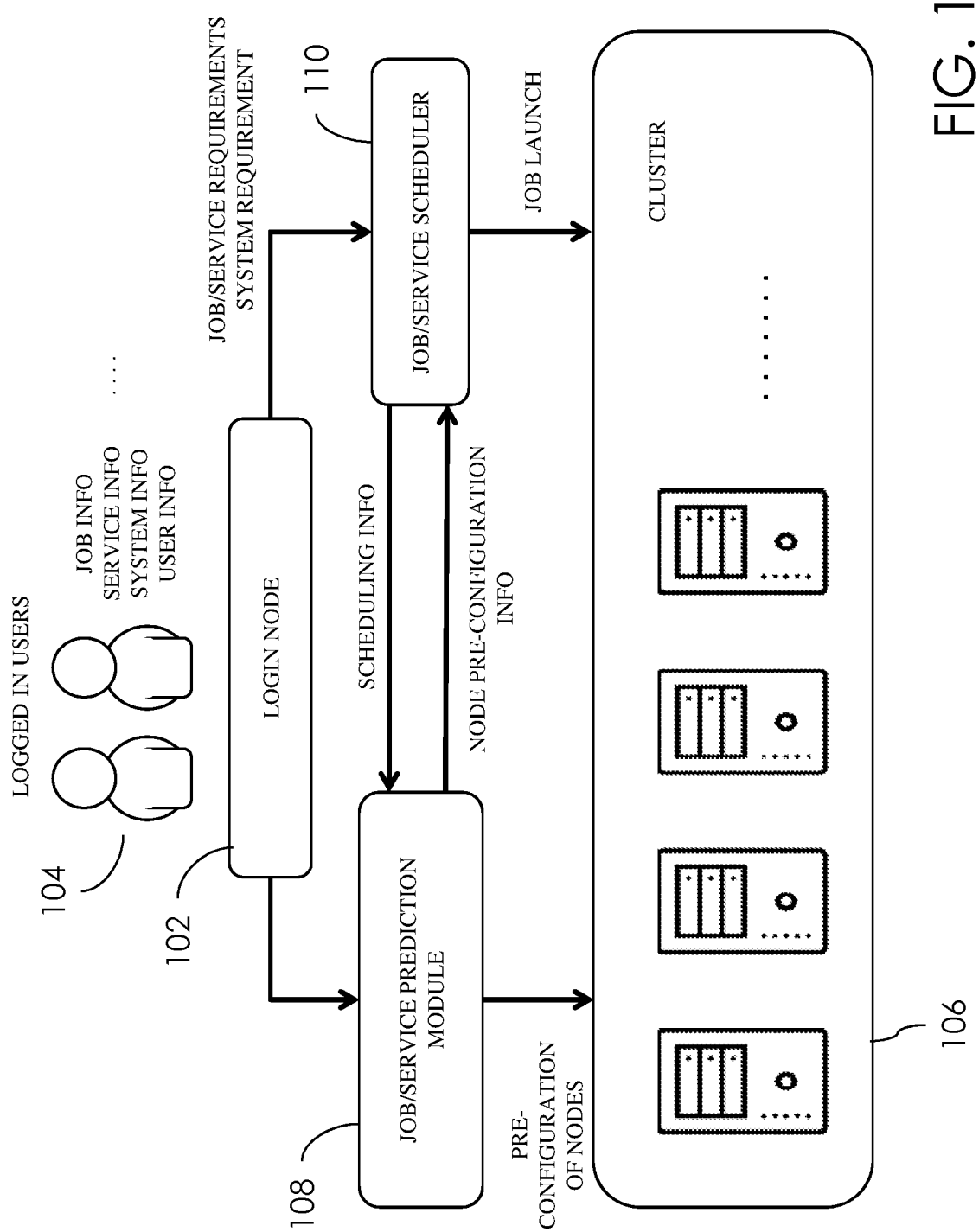
FIG. 1 is a diagram illustrating a system for pre-configuring a node for future job execution in an embodiment.

Systems, methods and techniques can be provided which can pre-configure one or more computer nodes such as computer servers to run a set of, or a series of, computer jobs or processes automatically and intelligently. A computer job or process is also referred to as a "job" or "service" for simplicity of explanation herein. Pre-configuring of a computer node in an embodiment can reduce job or service launch time. The computer node can be any computer, for example, with one or more hardware processors, cores, memory and other circuits. By way of example, the computer node or server can be a server in a supercomputer system, a cloud service computer, and/or another, and can be a part of a network of computers.

The pre-configuring in an embodiment can be done based on the job or service configuration prediction. In an embodiment, a method includes predicting a job configuration of a future job. In an embodiment, the pre-configuring method can be static or dynamic. In static mode, the method can implement or use one or more time series prediction techniques using historical data and the statistics associated with the historical data. Examples of historical data include, but are not limited to, data associated with a job, data associated with a computer system which ran or executed the job or associated with the job, data associated with a user submitting the job. Such data can be obtained of a plurality of jobs as historical data.

In dynamic mode, the method can train and run a machine learning algorithm such as a neural network, for example, recurrent neural network (RNN), Long Short Term Memory network (LSTM), to dynamically predict a job configuration for pre-configuration of a node. Training data set can include historical data. Such data can be collected and formatted into a training data set and an RNN or another neural network can be trained to predict a future job configuration.

An embodiment of an implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

An example of the neural network is a recurrent neural network (RNN), which can handle time series data or sequence based-data. In an embodiment, an RNN handles sequences of feature vectors representing a node configuration, for example, ordered by time. A recurrent neural network can have a series of neural network cells, which take as input a sequence of feature vectors and also activation information from the previous neural network in the previous time step. For example, copies of neural network are made over time with different inputs at different time steps. The copies of neural network can share weights over time. A neural network can take both the input feature vector at that time step (e.g., t=2) and activation information from the previous neural network at the previous time step (e.g., t=1), to predict the next feature vector, e.g., its output. For example, the activation value $a_1$ from time step 1 is passed onto time step 2. A neural network at time step 2 uses both the activation value and input feature vector to predict the feature vector. At each time step, the recurrent neural network passes on its activation to the next time step for use. Thus, at the current step, both the input feature vector for that step and information from previous feature vectors can be used to predict the next feature vector. A series of job configurations can be modeled as a time series data that can be predicted using an RNN. Different types of recurrent neural network models such as but not limited to Long Short-Term Memory (LSTM). For example, LSTM, a type of RNN, can be used to automatically handle the order between observation in learning a mapping function between inputs (e.g., user groups, configuration, timing) and output (next configuration and timing). Different types of neural network models, different types of deep learning neural network models can be used to predict node configuration. Yet in other aspects, different types of artificial intelligence models can be used.

FIG. 1 is a diagram illustrating a system for pre-configuring a node for future job execution in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

A computer system may include a plurality of nodes, e.g., a login node (also referred to as a head node) 102, where a user 104 can login and submit a job, and a cluster of nodes 106 that can be configured to run the job. A node, for example, can be a computer server. A node may contain other hardware components and/or devices such as a memory and a network device. A node (e.g., of a computer or a server), in some embodiments, may include one or more processors, e.g., one or more CPUs, one or more GPUs, one or more FPGAs, and/or another device. A node may also include other hardware components such as a memory and a network device. A processor can contain one or more cores, e.g., CPU cores. A processor or chip that contains multiple cores is referred to as a multi-core processor or chip, for instance, employing multi-core technology. As an example, a core can comprise a logical execution unit containing an L1 cache and functional units. Cores can independently execute programs or threads.

A job/service prediction module 108 or component can execute on a computer processor (e.g., on the login node) and predict a node configuration needed to run a future job. For example, the login node 102 may provide information associated with a job, service, system and user to the job/service prediction module 108. Examples of information associated with a job may include, but are not limited to, job identifier, job length, and job resource utilization. Examples of information associated with a service may include, but are not limited to, job queue, resource utilization priority, service level agreement and/or priority. Examples of information associated with a system may include, but are not limited to, resource specifications and resource available time. Examples of information associated with a user may include, but are not limited to, user identifier, user name and user group. Based on the received information, the job/service prediction module 108 may predict a node configuration. Using the predicted node configuration, the job/service prediction module 108 may pre-configure one or more nodes in the cluster 106 for running a future job.

The login node 102 sends job or service requirements and system requirements to a job/service scheduler 110. Examples of job requirement may include job identifier, job length, job resource utilization. Examples of service requirements may include job queue, resource utilization priority, service level agreement and/or priority. Examples of "system requirements" may include resource specifications, resource available time, and resource mapping. Based on the received requirements, the job/service scheduler 110 creates scheduling information and sends the scheduling information to the job/service prediction module 108.

The job/service prediction module 108 sends node pre-configuration information to the job/service scheduler 110, which launches a requested or scheduled job on one or more of the pre-configured nodes in the cluster of nodes 106. For example, the job/service prediction module 108 uses the information (e.g., associated with job, service, system and user) from the login node 102 and estimates the configuration setup for the next job (future job). Then, the job/service prediction module 108 sends the predicted configuration information to the cluster of nodes 106 and sets up the node(s). The job/service prediction module 108 also notifies the job/service scheduler 110 as to which node is or nodes are configured as predicted so that the job/service scheduler 110 can assign the job to the preconfigured nodes.

In embodiments, the job/service prediction module 108 can predict configuration of a node for running a future job or service and pre-configure one or more nodes accordingly using different approaches or techniques. For example, the job/service prediction module 108 can predict a node configuration based on analyzing or profiling statistical information associated with historical jobs, and using heuristics or rules, predict a node configuration. An example of an approach can include proportionally presetting nodes based on the historical node configuration from a window of time, for example, past 6 months. An example rule, which can be defined, is "if 70% of jobs are configured with simultaneous multithreading 4 (SMT4) and core-isolation==0 (no core isolation) in history (e.g., past 6 months of data), then pre-configure 70% of nodes with SMT4 and core-isolation==0".

As another example, the job/service prediction module 108 can predict a node configuration using a time series modeling technique such as a moving average, an exponential smoothing, or another time series modeling technique to predict a node configuration. As yet another example, the job/service prediction module 108 can predict a node configuration based on machine learning. For instance, a neural network such as an RNN or LSTM can be trained to predict a node configuration. In an embodiment, the job/service prediction module 108 can automatically configure, or select dynamically, which approach to use, for example, based on a criterion such as the accuracy of the prediction by each technique.

Examples of node configurations can include, but are not limited to, configuring for core isolation and configuring for simultaneous multithreading (SMT), for example, on superscalar processors or computers. Simultaneous multithreading can permit multiple independent threads of execution on a physical core. Core isolation can provide security feature for a job. By way of example, an experiment performed in pre-configuring SMT and core-isolation showed that there can be time savings in configuration time on a superscalar system.

Another example of node configuration can include configuring or setting up nodes under a cloud service. For instance, for a private cloud service (PCS), needed node configurations for a user's job may include one or more of networking, storage, servers, virtualization, operating system ("OS"), data and application configurations. Launching a job for a PCS service type may include setting up those features on one or more nodes on a cloud, and the service launch time for PCS can take minutes. As another example, for an Infrastructure as a Service (IaaS), needed node configurations for a user's job may include configuring OS, data and application. Launching a job on for IaaS type service, including setting up a node providing such an IaaS type service may take seconds to minutes. By way of yet another example, for a Platform as a Service (PaaS), needed node configurations may include application and data configuration. Setting up application and data features on one or more nodes for a PaaS type service can take time, e.g., seconds. Similarly, configuring a node for providing a Software as a Service (SaaS) type service can take time. Predicting node configuration for a future job and setting pre-configuring node in preparation for an incoming job thus can reduce job launch time.

Figure 2:
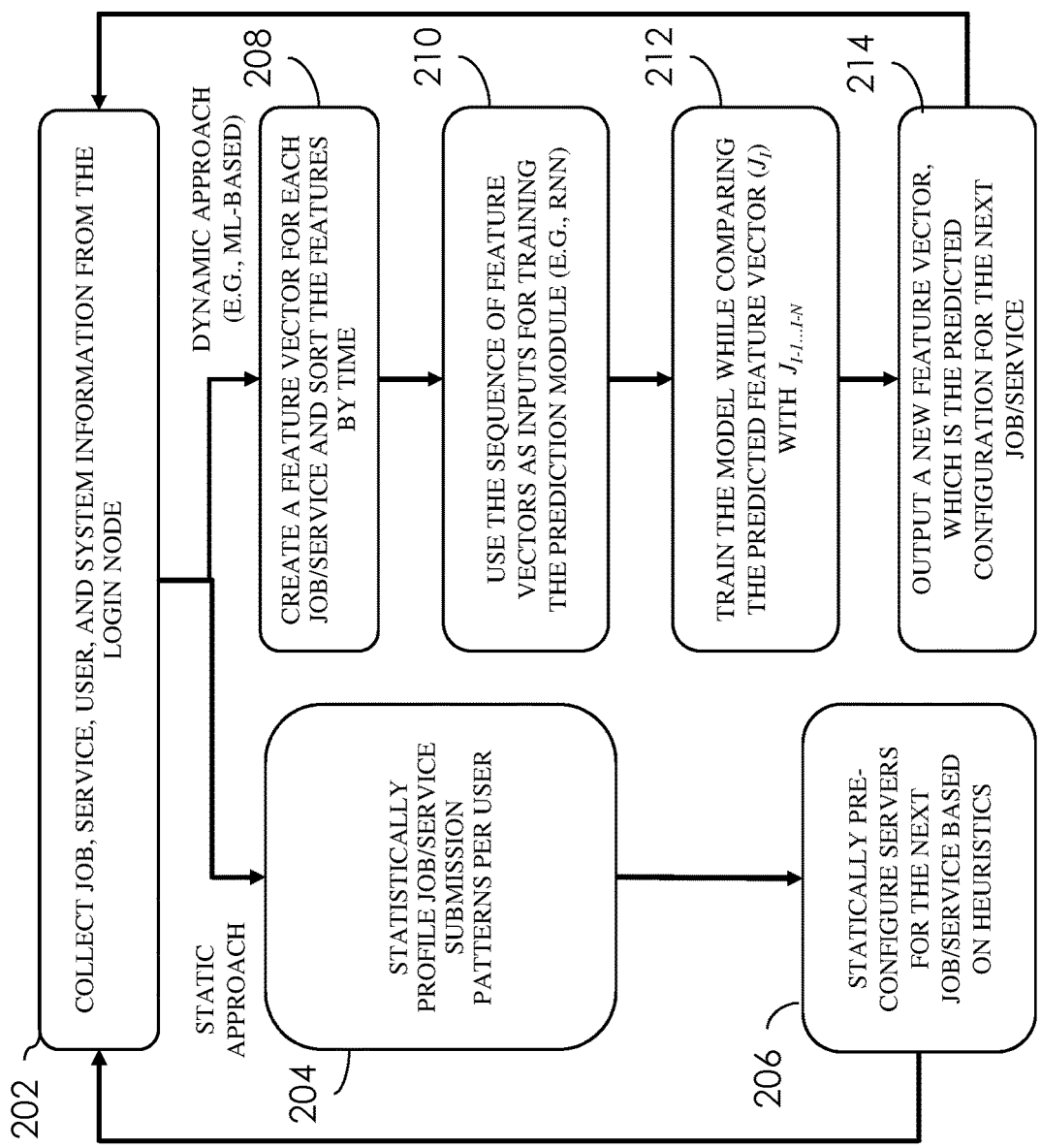
FIG. 2 is a diagram illustrating a method of training a prediction model in an embodiment.

FIG. 2 is a diagram illustrating a method of training a prediction model in an embodiment. The method can be performed by one or more hardware processors. For example, a head node or login node of a superscalar computer system, or a node in a cloud system, or another computer can perform the training, which can be offline or online. At 202, a job/service prediction module collects or receives information about jobs, services, users, and system information, for example, from a login node.

In an embodiment, the job/server prediction module can use a "static" approach in predicting a node configuration. For instance, at 204, the job/server prediction module may statistically profile a job/service submission pattern of a user, for example, for all users or each user being considered. At 206, based on the profiled patterns of a user and heuristics, the job/server prediction module can predict or determine a configuration for a node for running that user's future job submission. The job/server prediction module can pre-configure one or more nodes or servers for the future (e.g., the next job or service) according to the configuration determined based on the heuristics.

Different heuristic approaches can be used for implementing a job prediction. Some non-limiting examples of heuristics can include, but are not limited to, autoregressive integrated moving average modeling (ARIMA-type), chaos theory based modeling, branch prediction, and/or others.

Figure 5:
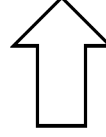
FIG. 5 shows examples of features and feature vector in an embodiment.

In an embodiment, the job/server prediction module can use a "dynamic" approach in predicting a node configuration. For instance, the job/server prediction module can train a machine learning model to predict a node configuration for a future job. At 208, the job/server prediction module may create a training data set. For instance, the job/server prediction module may create a feature vector for each job or service and sort the features by order of time or time sequence. Examples of features used to create a feature vector are shown in FIG. 5. It is noted, however, the features are not limited to those shown. Other features (attributes) can be used to build a feature vector.

At 210, the job/server prediction module uses the sequence of feature vectors as inputs for training a prediction model, a neural network model, for example, an RNN.

At 212, the job/server prediction module trains the prediction model. To train an RNN, the job/server prediction module may use n−1 samples (vectors $(j_{i-1})$ . . . $(j_{i-n})$) for input and 1 sample $(j_i)$ for output. For example, the predicted feature vector $(j_i)$ can be compared with known ground truth feature vector $(j_i)$. In RNN, those values are compared to calculate the loss function. By way of example, the input of the model is a sequence of n−1 feature vectors J (i.e., $(j_{i-1})$ . . . $(j_{i-n})$) and the output is the predicted vector at time i (predicted $j_i$). The loss can be computed once the $j_i$ is known, comparing it with the predicted one.

At 214, the trained neural network, for example, RNN, can output a new feature vector, which is the predicted configuration for the next job or service.

Figure 3:
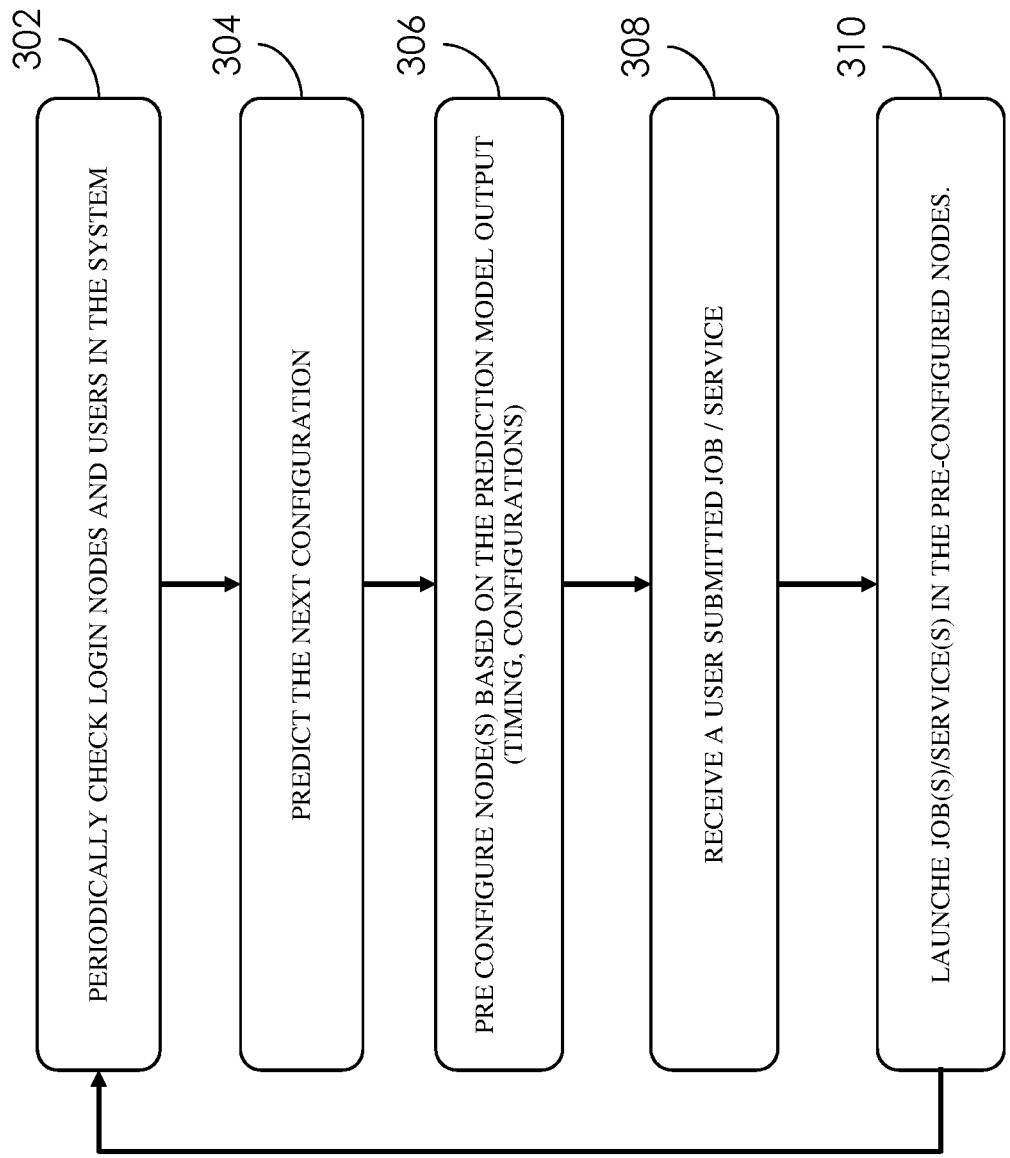
FIG. 3 is a diagram illustrating a method in an embodiment of deploying the trained neural network in an embodiment, which predicts a node configuration for running a future job.

FIG. 3 is a diagram illustrating a method in an embodiment of deploying the trained neural network in an embodiment, which predicts a node configuration for running a future job. At 302, a computer processor, e.g., the job/service prediction module running on the computer processor, can periodically check login nodes and user logged into a computer system such as a super computer system or a cloud system.

At 304, the job/service prediction module predicts the next node configuration. For example, the job/service prediction module runs the built neural network model with input feature vector that includes features associated with the current time window of data of a user. In an embodiment, multiple such predictions can be made by running the model with multiple different user data.

At 306, the job/service prediction module pre-configures one or more nodes based on the prediction model's output. The prediction model's output may include a specific configuration and a time or time period during which a node is to be configured with the specific configuration.

At 308, user's job submission is received. For example, a login node or another node may receive a user's job or service request. At 310, a scheduler may launch the submitted job in the one or more pre-configured nodes. In an embodiment, if the submitted job requires a different configuration from the configuration of the pre-configured nodes, the login node or another processor may re-configured the re-configured nodes, and/or configure another node for the submitted job. In this example case, the job/service prediction module can receive a feedback, for example, that the node pre-configuration prediction was not accurate. For example, the login node or another processor or processing component may automatically notify the job/service prediction module. The job/service prediction module may automatically retrain the prediction model based on the feedback.

Figure 4:
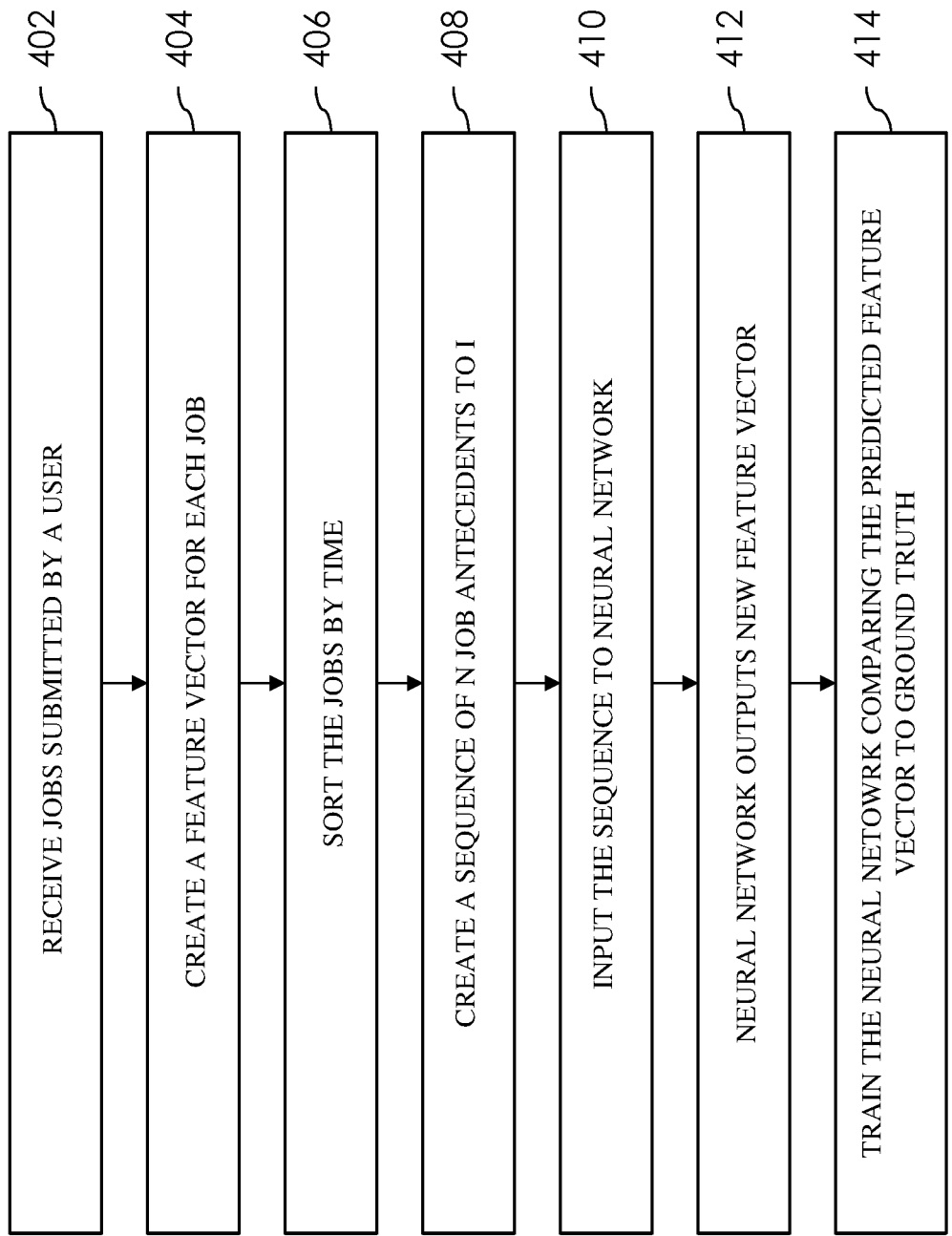
FIG. 4 is another diagram illustrating a method of performing a dynamic pre-configuration using a neural network in an embodiment.

FIG. 4 is another diagram illustrating a method of performing a dynamic pre-configuration using a neural network in an embodiment. The method can be performed by one or more hardware processors, e.g., a computer processor. At 402, a processor may receive or obtain jobs or services submitted by a user u or by a cluster of users. For example, historical data associated with a user or a group of users having similar job submission pattern can be obtained. To group users by clusters, a clustering algorithm such as a K-means algorithm or another clustering algorithm can be used.

At 404, the processor may create a feature vector for each job or service. FIG. 5 shows examples of features extracted from a user's historical data and used in building a feature vector in an embodiment.

At 406, the processor may sort the jobs by time. For example, the feature vectors can be sorted by time based on the times of the corresponding jobs. In an embodiment, the processing at 402, 404 and 406 include processing stages for data preparation per user u (or a cluster of users), for example, for training a neural network, for example, an RNN.

At 408, for each job $j_i$, the processor may create a sequence of N job antecedents to i, as $j_{i-N}, \ldots, j_{i-1}$. N can be configurable and can be based on one or more factors. An example of a factor may include, but is not limited to, the number of users using a cluster of nodes. An example of N can be 10, 20, or another value. At 410, the processor uses the sequence as input for training the neural network, for example, an RNN. Each input is a sequence of features. For instance, feature vectors associated with the N−1 sequence (ordered by time) of jobs is input to RNN. The N-th feature vector can be used as ground truth value for comparing with a predicted feature vector. In an embodiment, the processing performed at 408 and 410 can include sequence input for the neural network, for example, RNN. In an embodiment, user information is one of the parameters in training the RNN, and a trained RNN can handle all or multiple users or jobs from multiple users.

At 412, the neural network (e.g., RNN) outputs a new feature vector, which is the predicted configuration for the next job or service. At 414, the training of the neural network, for example, RNN, includes comparing the predicted feature vector to the feature vector associated with the job $j_1$. The neural network can be trained over multiple sequences representing moving windows of time. The trained neural network, for example, RNN, can be run to predict a node configuration for a next job. In an embodiment, the processing at 412 and 414 can include inference and training stages.

FIG. 5 shows examples of features and feature vector in an embodiment. For example, 502 shows history information or historic data associated with a user's job. A processor in an embodiment may extract features from the historic data 502 and create a feature vector 504, which includes a plurality of attributes associated with a user's job submission. For example, for all jobs being considered which have been submitted by a user, a feature vector can be created for each job. The features and historic data in FIG. 5 are illustrated only as examples. Other features can be used and different feature vectors can be created. Based on the historic data 502, various features can be extracted such as, but not limited to, waiting time for the job to launch after submission, whether to use a cluster manager computer to launch the job, number of nodes, number of cores, job number, user identifier, job identifier, project identifier, time submitted, time started, running time, features related to diagnostics, and/or others. A feature vector created in JavaScript Object Notation (JSON) format is shown at 504.

The disclose methodology in an embodiment can reduce job launch time by pre-configuring one or more computer nodes on which the job can be run. Such pre-configuring, for example, can decrease the overall time a job spends on a computer system, for example, from submission to completion. By pre-configuring one or more computer nodes, the methodology can save bandwidth, e.g., time. By way of example, node configuration time can vary based on the configurations needed on the node. For instance, node configuration time can be longer for core isolation set ups. As another example, node configuration time can be longer for lower simultaneous multithreading (SMT) modes (e.g., SMT 4<2<1).

Figure 6:
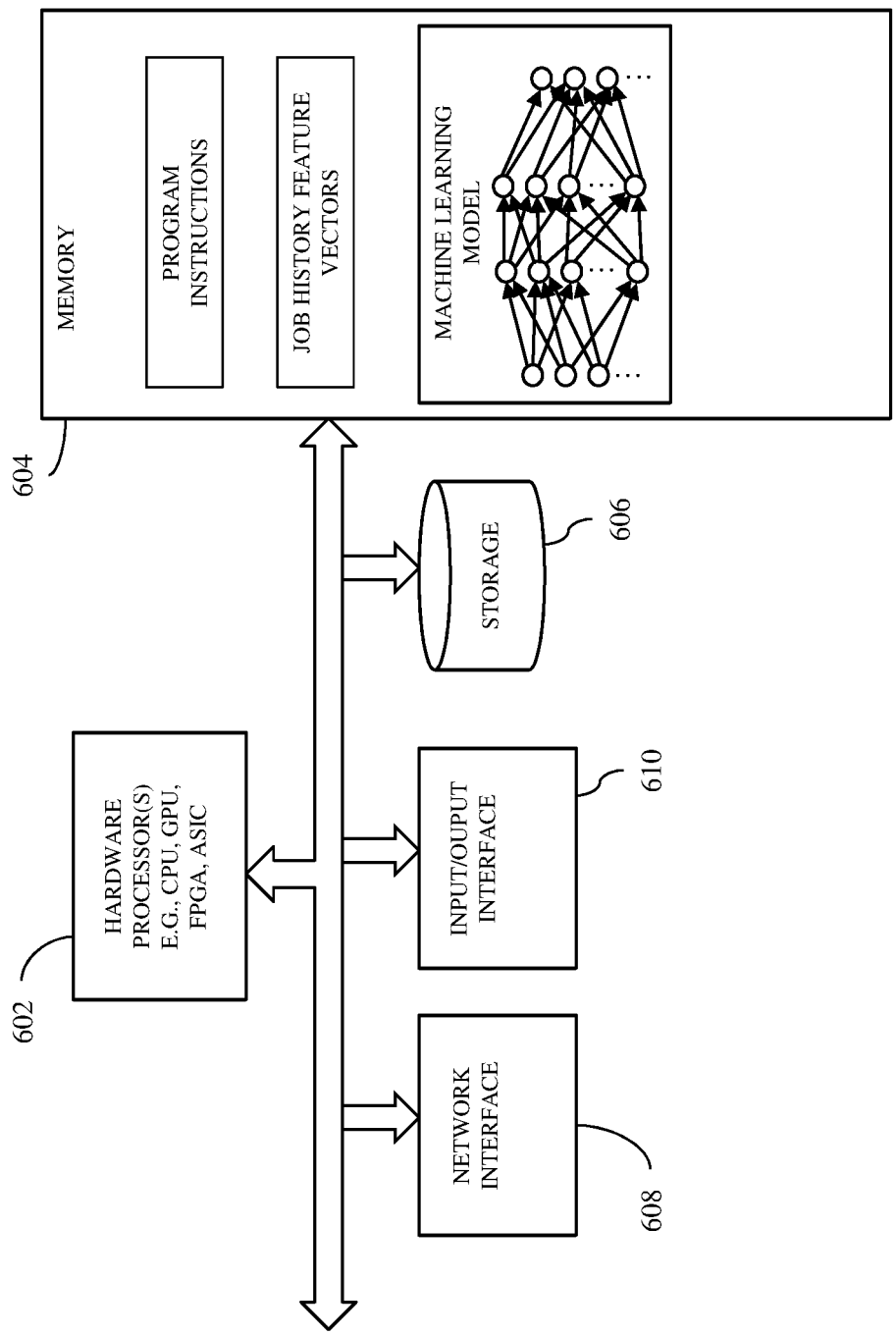
FIG. 6 is a diagram showing components of a system in one embodiment that can perform node configuration prediction and pre-configuration.

FIG. 6 is a diagram showing components of a system in one embodiment that can perform node configuration prediction and pre-configuration. In an embodiment, pre-configuring a node can reduce job launch time. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate or prepare training data, e.g., feature vector data based on historical job data, for example, per user or user group, for training a machine learning model such as a neural network model, which can be an RNN or LSTM, but not limited to such. One or more hardware processors 602 may train the neural network model to predict a node configuration for a next future or incoming job. One or more hardware processors 602 may pre-configure one or more computer servers or nodes according to the prediction. One or more hardware processors 602 may also receive a job submission and launch the received job submission on the one or more nodes, which have been pre-configured based on the neural network's prediction.

A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input including historic job data, for example sorted by user. Such historic data may be stored in a storage device 606 or received via a network interface 608 from a remote device, and may be temporarily loaded into a memory device 604 for building or generating the prediction model (e.g., training a neural network). The learned prediction model may be stored on a memory device 604, for example, for execution by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
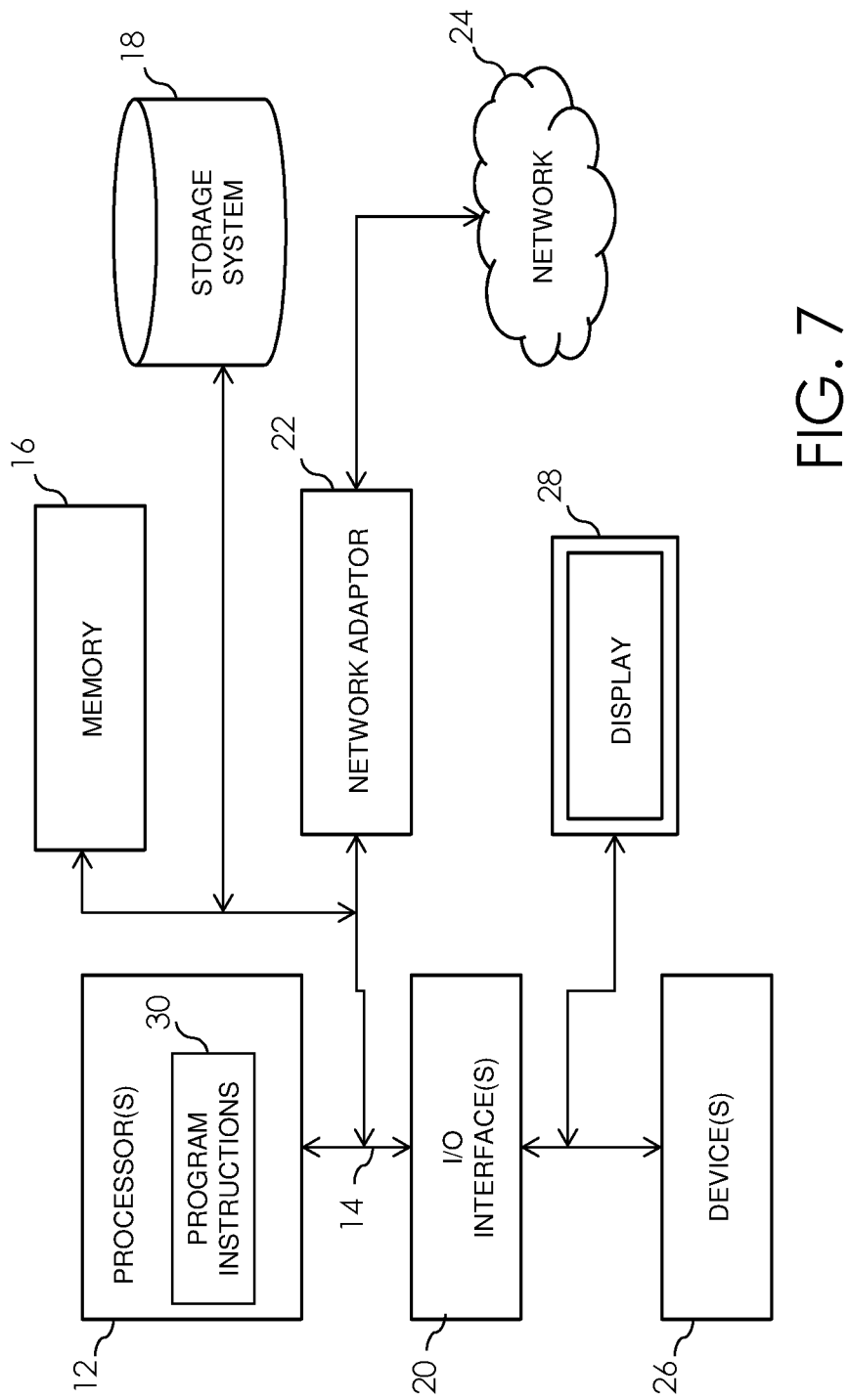
FIG. 7 illustrates a schematic of an example computer or processing system that may implement a system according to an embodiment.

FIG. 7 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
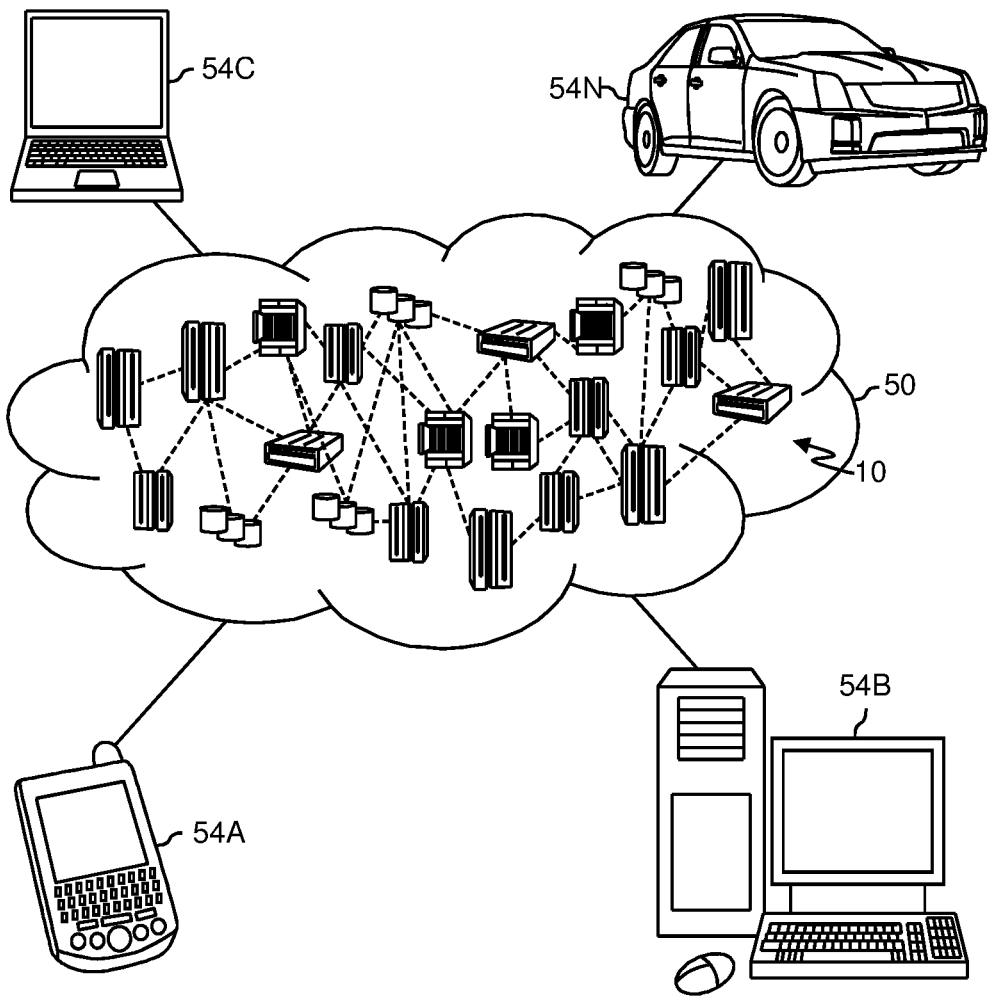
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
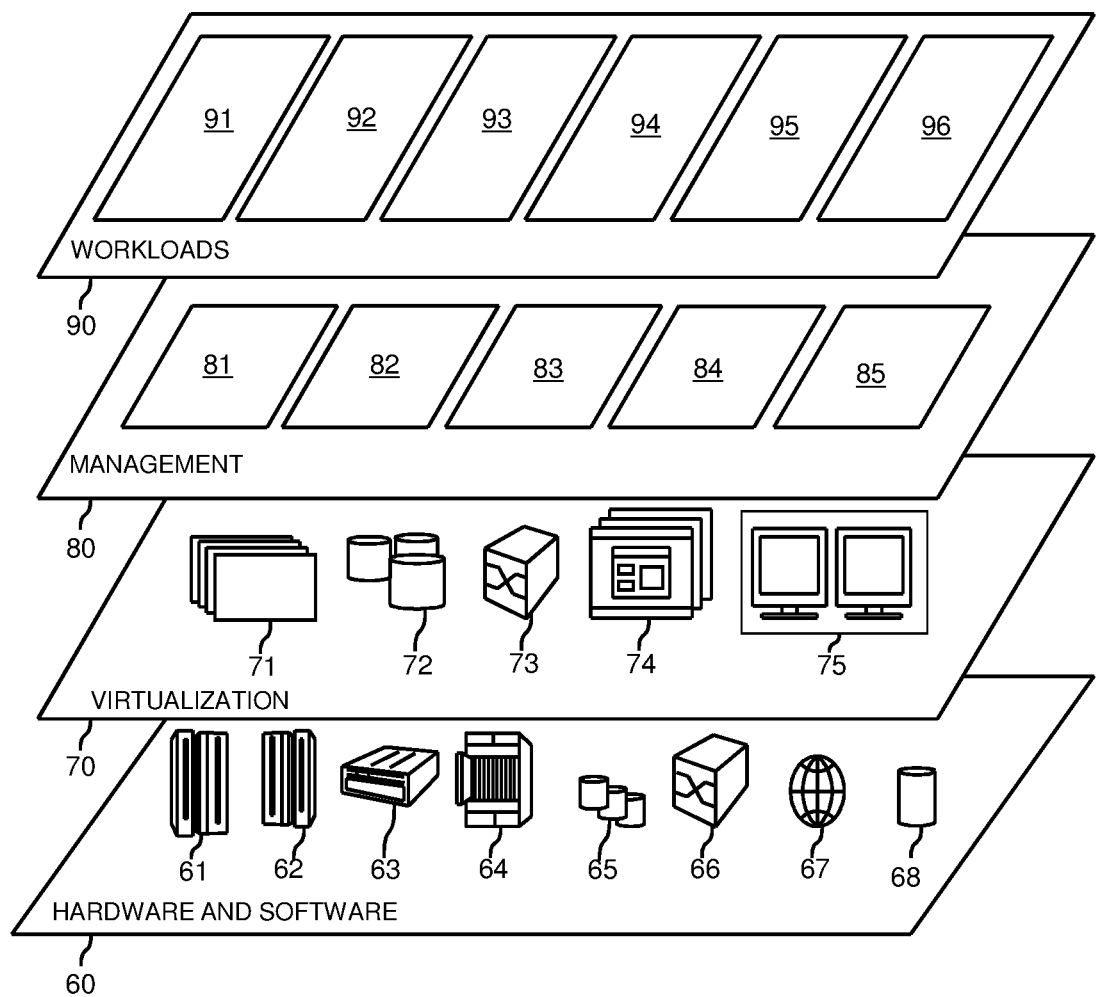
FIG. 9 illustrates a set of functional abstraction layers provided by cloud computing environment in one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and node pre-configuration processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a computer processor;
a memory device operatively coupled with the computer processor;
the computer processor configured to at least:
based on historic job data, at least one job requirement and at least one system requirement associated with a future computer job, predict a configuration of a computer node for running the future computer job;
pre-configure at least one computer node in a cluster of computer nodes based on the predicted configuration;
create scheduling information using the at least one job requirement and the at least one system requirement, the at least one system requirement including at least a resource available time;
responsive to receiving a submission of a job scheduled in the scheduling information and receiving a notification that at least one computer node has been pre-configured, launch the job on the at least one pre-configured computer node, which is selected for pre-configuration among the cluster of computer nodes; and
receive feedback indicating whether the predicted configuration is accurate, and responsive to receiving feedback indicating that the predicted configuration is inaccurate, reconfigure a prediction approach that predicts the configuration.

2. The system of claim 1, wherein the computer processor is configured to predict the configuration of the computer node by using a time series prediction technique using the historic job data.

3. The system of claim 1, wherein the computer processor is configured to train a neural network to predict the configuration of the computer node.

4. The system of claim 3, wherein the computer processor is configured to generate a sequence of feature vectors representing attributes extracted from the historic job data.

5. The system of claim 4, wherein the computer processor is configured to train the neural network using the sequence of feature vectors sorted by time.

6. The system of claim 5, wherein the neural network includes a recurrent neural network.

7. The system of claim 5, wherein the neural network includes a Long short Term Memory network (LSTM).

8. The system of claim 1, wherein the pre-configuring includes setting up the computer node for simultaneous multithreading.

9. The system of claim 1, wherein the pre-configuring includes setting up the computer node for core isolation.

10. The system of claim 1, wherein the pre-configuring includes setting up the computer node for at least one selected from a group of: networking, storage, server, virtualization, operating system, data and application.

11. A computer-implemented method comprising:
based on historic job data, predicting a configuration of a computer node for running a future computer job;
pre-configuring the computer node using the predicted configuration;
creating scheduling information using the at least one job requirement and the at least one system requirement, the at least one system requirement including at least a resource available time;
responsive to receiving a submission of a job scheduled in the scheduling information and receiving a notification that at least one computer node has been pre-configured, launching the job on the pre-configured computer node,
wherein the predicting a configuration of a computer node for running a future computer job includes creating a feature vector for each of historic jobs in the historic job data, wherein a plurality of feature vectors is created corresponding to respective historic jobs, sorting the feature vectors by time, and predicting a new feature vector based on the sorted feature vectors, the new feature vector representing the predicted configuration for the job; and
receiving feedback indicating whether the predicted configuration is accurate, and responsive to receiving feedback indicating that the predicted configuration is inaccurate, reconfigure a prediction approach that predicts the configuration.

12. The method of claim 11, wherein the predicting includes predicting the configuration of the computer node by using a time series prediction technique using the historic job data.

13. The method of claim 11, wherein the predicting includes running a trained machined learning model to predict the configuration of the computer node.

14. The method of claim 13, further including generating a sequence of feature vectors representing attributes extracted from the historic job data.

15. The method of claim 14, wherein the trained machine learning model is a neural network, the method further including training the neural network using the sequence of feature vectors sorted by time.

16. The method of claim 15, wherein the neural network includes a recurrent neural network.

17. The method of claim 15, wherein the neural network includes a Long short Term Memory network (LSTM).

18. The method of claim 1, wherein the pre-configuring includes setting up the computer node for simultaneous multithreading.

19. The method of claim 1, wherein the pre-configuring includes setting up the computer node for core isolation.

20. A computer program product comprising a computer readable storage medium having program instructions embodied therewith, the program instructions executable by a device to cause the device to:

based on historic job data, predict a configuration of a computer node for running a future computer job;

pre-configure the computer node based on the predicted configuration;

create scheduling information using the at least one job requirement and the at least one system requirement, the at least one system requirement including at least a resource available time;

responsive to receiving a submission of a job scheduled in the scheduling information and receiving a notification that at least one computer node has been pre-configured, launch the job on the pre-configured computer node, wherein the predicting a configuration of a computer node for running a future computer job includes creating a feature vector for each of historic jobs in the historic job data, wherein a plurality of feature vectors is created corresponding to respective historic jobs, sorting the feature vectors by time, and predicting a new feature vector based on the sorted feature vectors, the new feature vector representing the predicted configuration for the job; and receive feedback indicating whether the predicted configuration is accurate, and responsive to receiving feedback indicating that the predicted configuration is inaccurate, reconfigure a prediction approach that predicts the configuration.

\* \* \* \* \*